(12) United States Patent
Huang et al.

(10) Patent No.: US 10,514,497 B2
(45) Date of Patent: Dec. 24, 2019

(54) PHOTONICS PACKAGING METHOD

(71) Applicant: Rain Tree Photonics Pte. Ltd., Singapore (SG)

(72) Inventors: Ying Huang, Singapore (SG); Tsung-Yang Liow, Singapore (SG)

(73) Assignee: Rain Tree Photonics PTE. LTD., Singapore (SG)

( * ) Notice: Subject to any disclaimer, the term of this patent is extended or adjusted under 35 U.S.C. 154(b) by 0 days.

(21) Appl. No.: 16/245,820

(22) Filed: Jan. 11, 2019

(65) Prior Publication Data
US 2019/0219761 A1    Jul. 18, 2019

Related U.S. Application Data

(60) Provisional application No. 62/616,441, filed on Jan. 12, 2018.

(51) Int. Cl.
G02B 6/12    (2006.01)
G02B 6/26    (2006.01)
G02B 6/14    (2006.01)
G02B 6/122    (2006.01)

(52) U.S. Cl.
CPC .......... *G02B 6/12004* (2013.01); *G02B 6/14* (2013.01); *G02B 6/26* (2013.01); *G02B 6/1225* (2013.01); *G02B 2006/1213* (2013.01)

(58) Field of Classification Search
CPC .......... G02B 6/14; G02B 6/26; G02B 6/1225
See application file for complete search history.

(56) References Cited

U.S. PATENT DOCUMENTS

| | | | | |
|---|---|---|---|---|
| 6,693,936 B2 * | 2/2004 | Kitaoka | ............ | G02B 6/12004 372/50.1 |
| 7,522,648 B2 * | 4/2009 | Park | ............ | G02B 6/4232 372/50.1 |
| 9,323,012 B1 * | 4/2016 | Sun | ............ | G02B 6/42 |
| 2007/0025663 A1 * | 2/2007 | Kuroda | ............ | G02B 6/30 385/49 |

* cited by examiner

*Primary Examiner* — Sung H Pak
(74) *Attorney, Agent, or Firm* — Dinsmore & Shohl, LLP

(57) ABSTRACT

A photonics packaging method is provided. The photonics packaging method includes providing a substrate (10) and attaching a first optical device (12) to the substrate (10). The first optical device (12) includes a first mode converter (14) optically coupled to a first integrated photonics chip (16). A second optical device (32) is also attached to the substrate (10). The second optical device (32) includes a second mode converter (34) optically coupled to a second integrated photonics chip (36). The second optical device (32) is of a greater height than the first optical device (12). An index-matching material (56) is disposed in a space between the first and second optical devices (12) and (32) and a force is applied on the second optical device (32) to cause the second optical mode converter (34) to align with the first optical mode converter (14). The index-matching material (56) is subsequently cured.

14 Claims, 7 Drawing Sheets

PHOTONICS PACKAGING METHOD

CROSS REFERENCE TO RELATED APPLICATION

This application claims the benefit of priority under 35 U.S.C. § 119(e) to U.S. Provisional Application Ser. No. 62/616,441, filed Jan. 12, 2018, incorporated by reference herein in its entirety.

FIELD

The present invention relates to the field of photonics and more particularly to a photonics packaging method.

BACKGROUND

After decades of development, silicon photonics technology has matured in recent years with products gradually making market entrance. Despite superior performance demonstrated in many areas such as modulation and detection, certain key functionalities are still unsuitable for monolithic integration. Noticeable examples include optical source and wavelength division multiplexers due to unfavourable material properties in light generation and temperature stability. Hybrid integration and inter-chip photonics packaging are two common approaches to address this. Photonics packaging is often preferred in industry due to its superior yield and design flexibility. Alignment tolerance is however a critical parameter for achieving high yield in photonics packaging. It would therefore be desirable to provide a photonics packaging method with improved alignment tolerance.

SUMMARY

Accordingly, in a first aspect, the present invention provides a photonics packaging method. The photonics packaging method includes providing a substrate and attaching a first optical device to the substrate. The first optical device includes a first mode converter optically coupled to a first integrated photonics chip. A second optical device is also attached to the substrate. The second optical device includes a second mode converter optically coupled to a second integrated photonics chip. The second optical device is of a greater height than the first optical device. An index-matching material is disposed in a space between the first and second optical devices and a force is applied on the second optical device to cause the second optical mode converter to align with the first optical mode converter. The index-matching material is subsequently cured.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

A photonics packaging method is described below with reference to FIGS. 1A and 1B.

Figure 1A:
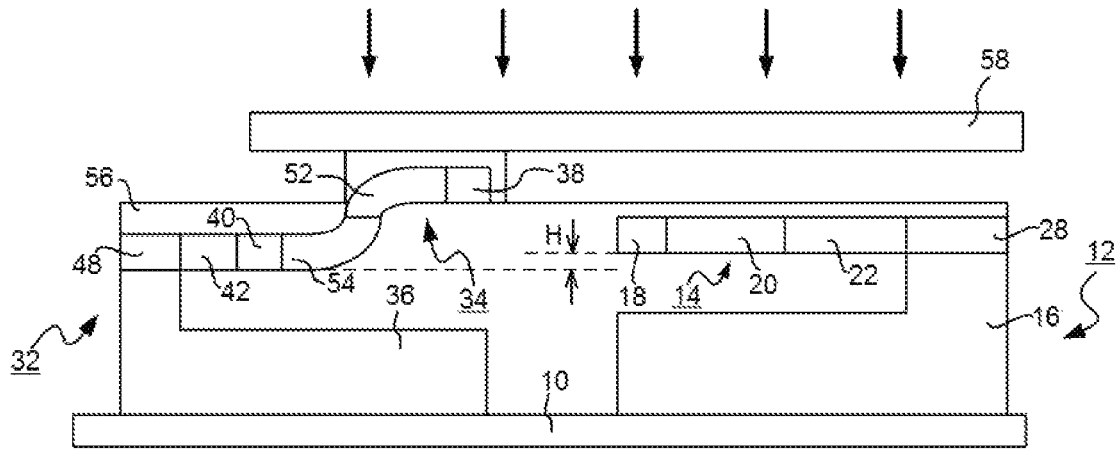
FIGS. 1A and 1B are schematic cross-sectional views illustrating a photonics packaging method in accordance with an embodiment of the present invention.

Referring now to FIG. 1A, the photonics packaging method begins by providing a substrate 10. The substrate 10 may be any conventional packaging substrate.

A first optical device 12 is attached to the substrate 10, the first optical device 12 including a first mode converter 14 optically coupled to a first integrated photonics chip 16. As can be seen from FIG. 1A, the first mode converter 14 has a flat or planar surface.

Figure 2A:
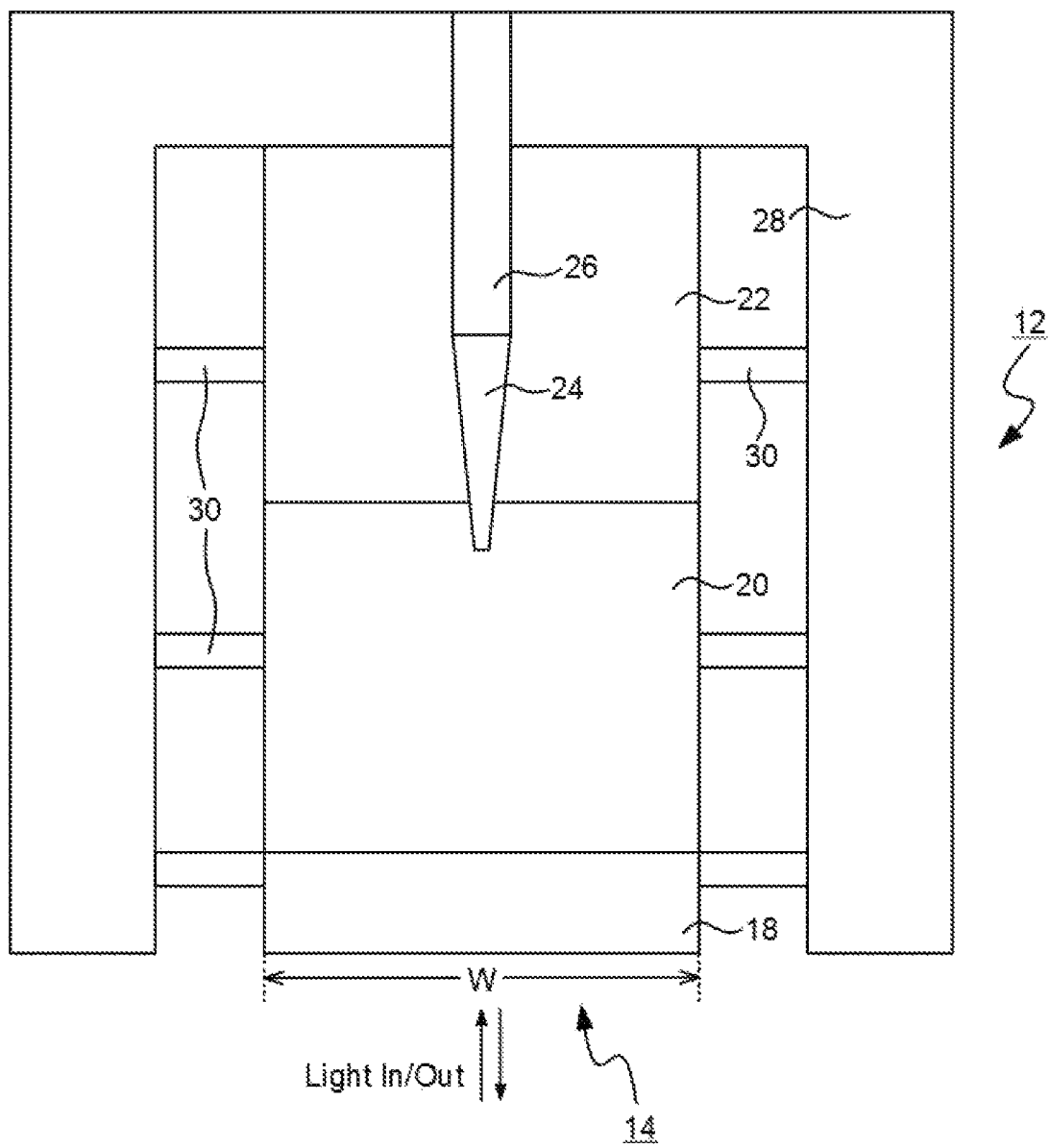
FIG. 2A is a schematic top plan view of a first optical device in accordance with an embodiment of the present invention.

Referring now to FIG. 2A, a schematic top plan view of the first optical device 12 in accordance with an embodiment of the present invention is shown. As can be seen from FIG. 2A, the first mode converter 14 of the first optical device 12 may include a first input/output or receiving waveguide 18, a first transmission waveguide 20 and a first transition waveguide 22. Incoming light is first coupled into the first input/output waveguide 18, propagates through the first transmission waveguide 20 and transits into an actual circuit of the first integrated photonics chip 16. A waveguide system on the actual circuit may be composed of different optical materials such as, for example, silicon, silicon nitride or silicon oxy-nitride. A first nano-taper 24 may be used to enable low-loss transition from the first transmission waveguide 20 to a first actual circuit waveguide 26 within the first transition waveguide 22. Outgoing light takes a reverse path to that described. These structures are released from a surrounding first plateau 28 and a chip substrate 16 with a plurality of first supporting beams 30 to ensure mechanical stability.

To improve alignment tolerance in a lateral direction (X-direction), the first input/output waveguide 18 may be designed to have a width W of greater than 15 microns (μm).

Figure 2B:
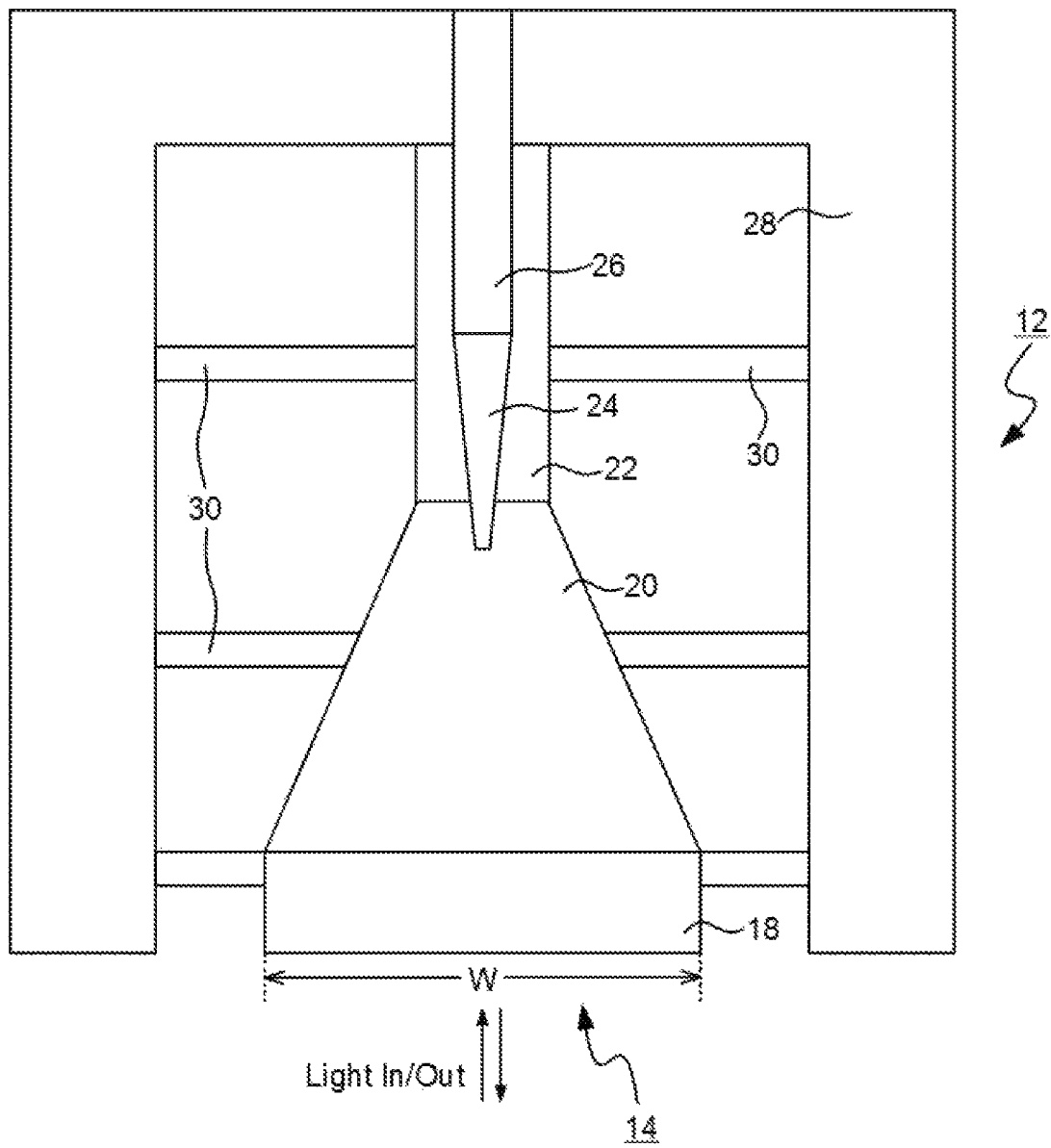
FIG. 2B is a schematic top plan view of a first optical device in accordance with another embodiment of the present invention.

Although illustrated as being a straight transmission waveguide, the first transmission waveguide 20 is not limited to being a straight waveguide. In an alternative embodiment as shown in FIG. 2B, the first mode converter 14 of the first optical device 12 may be formed with a linearly tapered transmission waveguide. In such an embodiment, a linear taper may be employed to further reduce the transition loss to the first actual circuit waveguide 26.

Referring again to FIG. 1A, a second optical device 32 is also attached to the substrate 10. The second optical device 32 includes a second mode converter 34 optically coupled to a second integrated photonics chip 36.

Figure 3A:
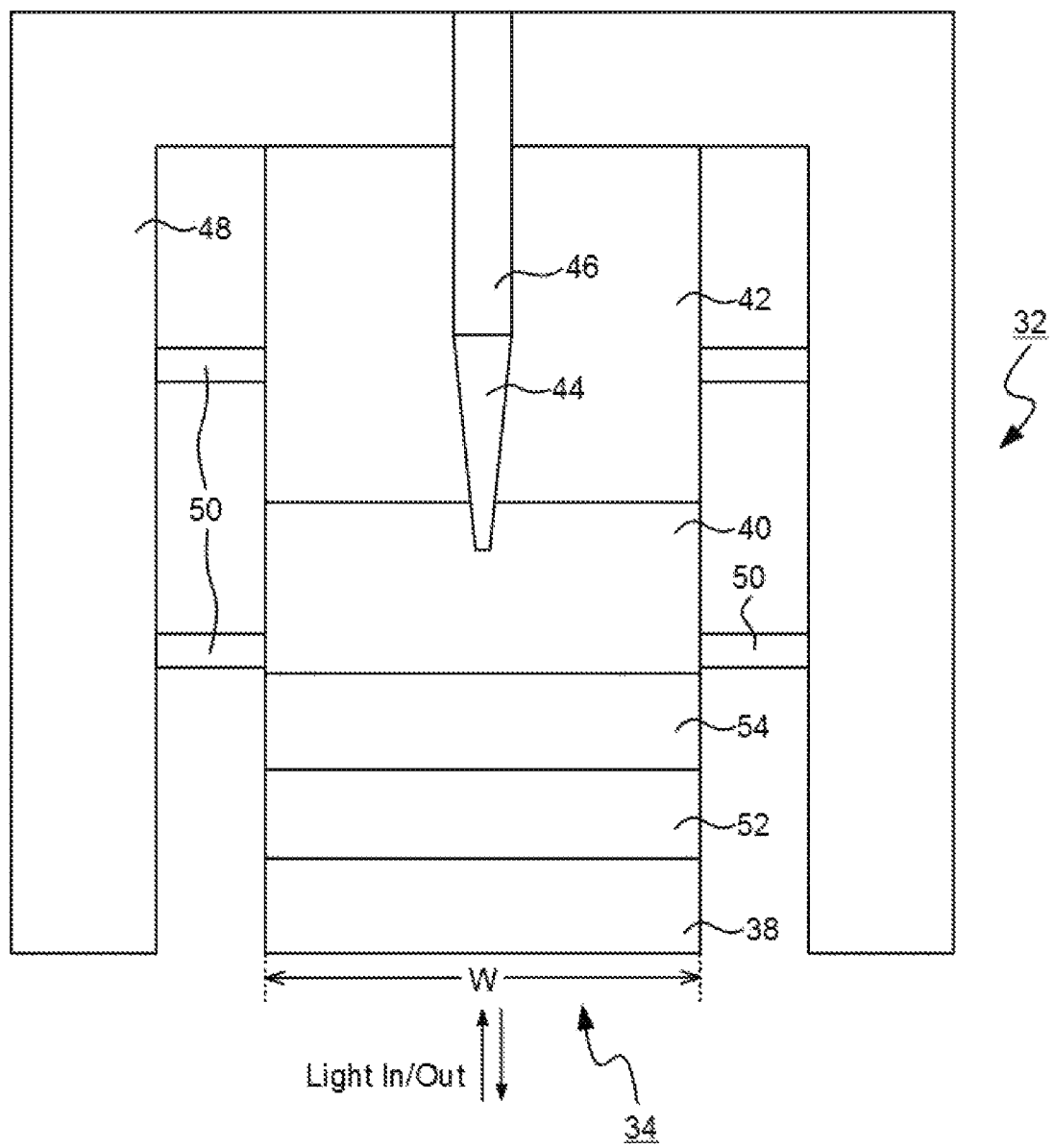
FIG. 3A is a schematic top plan view of a second optical device in accordance with an embodiment of the present invention.

Referring now to FIG. 3A, a schematic top plan view of the second optical device 32 in accordance with an embodiment of the present invention is shown. Similarly to the first mode converter 14 of the first optical device 12, the second mode converter 34 of the second optical device 32 may include a second input/output waveguide 38, a second transmission waveguide 40 and a second transition waveguide 42. A second nano-taper 44 may be used to enable low-loss transition from the second transmission waveguide 40 to a second actual circuit waveguide 46 within the second transition waveguide 42. These structures are again released from a surrounding second plateau 48 and a chip substrate 36 with a plurality of second supporting beams 50 to ensure mechanical stability.

To improve alignment tolerance in a lateral direction (X-direction), the second input/output waveguide 38 may be designed to have a width W of greater than 15 microns (μm).

Figure 3B:
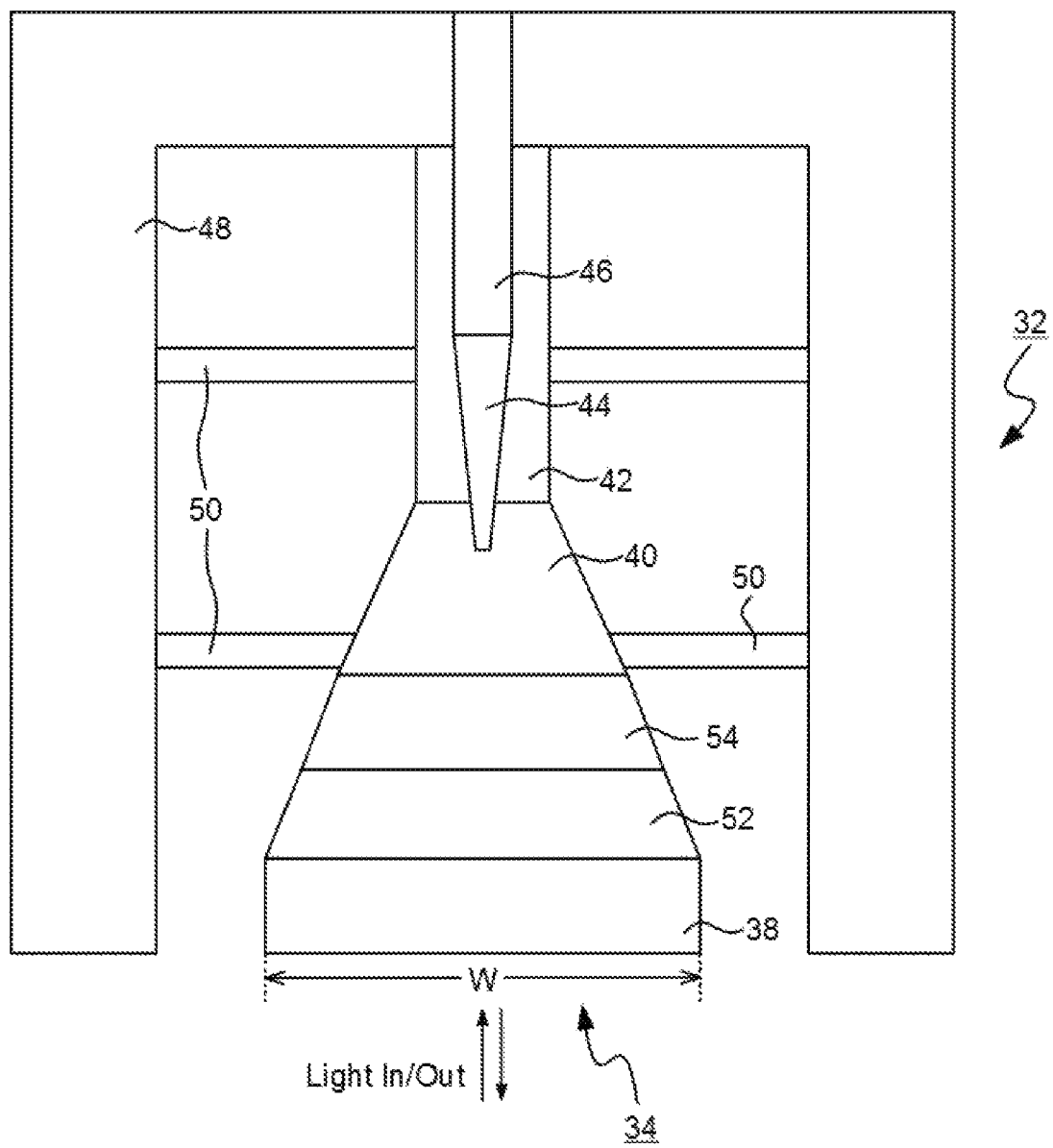
FIG. 3B is a schematic top plan view of a second optical device in accordance with another embodiment of the present invention.
Figure 4A:
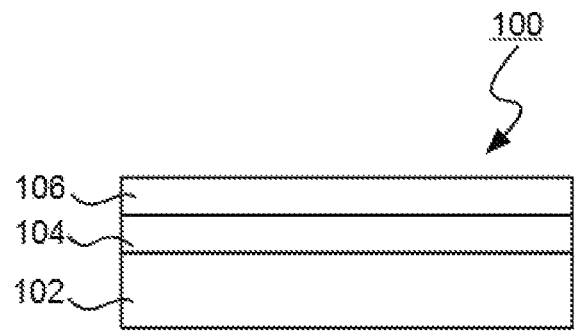
FIGS. 4A through 4E are schematic cross-sectional views illustrating a method of manufacturing an optical device in accordance with an embodiment of the present invention.
Figure 4B:
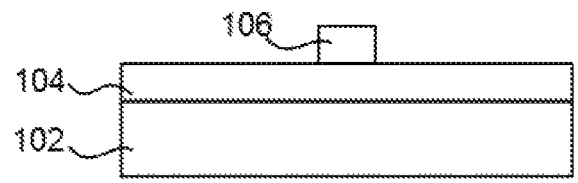
Figure 4C:
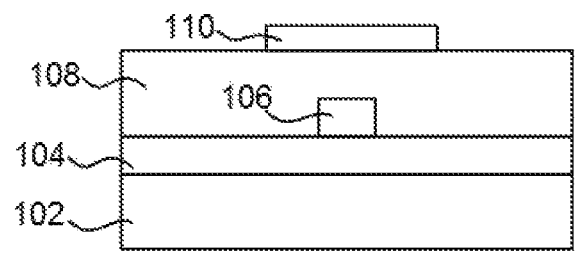
Figure 4D:
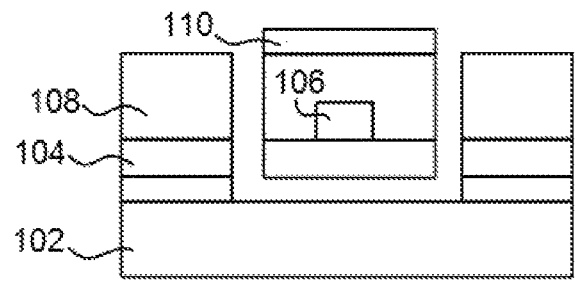
Figure 4E:
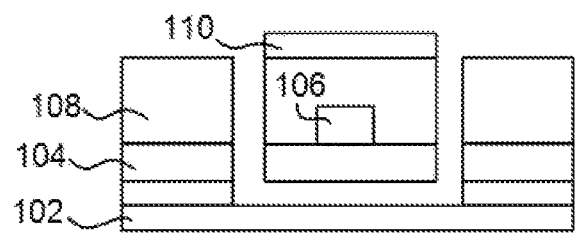

Although illustrated as being a straight transmission waveguide, the second transmission waveguide 40 is not limited to being a straight waveguide. In an alternative embodiment as shown in FIG. 3B, the second mode converter 34 of the second optical device 32 may be formed with a linearly tapered transmission waveguide. In such an embodiment, a linear taper may be employed to further reduce the transition loss to the second actual circuit waveguide 46.

Referring again to FIG. 1A, the second optical device 32 is of a greater height than the first optical device 12. In the embodiment shown, an input/output region or waveguide 38 of the second mode converter 34 is in a first plane and a transmission region or waveguide 40 of the second mode converter 34 is in a second plane, the first plane being further from the second integrated photonics chip 36 than the second plane. In the present embodiment, the second mode converter 34 includes a curved section 52 and 54 extending between the input/output region 38 of the second mode converter 34 in the first plane and the transmission region 40 of the second mode converter 34 in the second plane. This may be achieved by insertion of first and second stress-compensated waveguides 50 and 52 between the input/output region or waveguide 38 and the transmission region or waveguide 40. In this manner, the curved section 52 and 54 of the second mode converter 34 may serve as a stress compensated region of the second mode converter 34. In the embodiment shown, the curved section 52 and 54 of the second mode converter 34 has an S-shaped cross-sectional profile. More particularly, the second mode converter 34 of the second optical device 32 of the present embodiment is designed to have an upward-bending S-shape as shown in FIG. 1A with the first stress-compensated waveguide 50 being designed to be upward bending and the second stress-compensated waveguide 52 being designed to curve in an opposite direction to level the input/output region or waveguide 38.

A method of manufacturing the first and second optical devices 12 and 32 including alternative methods of fabricating the first and second mode converters 14 and 34 will now be described below with reference to FIGS. 4A through 4E.

Referring now to FIGS. 4A through 4E, schematic cross-sectional views illustrating an exemplary method of manufacturing the first and second optical devices 12 and 32 are shown. The fabrication process starts with provision of a commercially available silicon-on insulator (SOI) wafer 100 including a silicon (Si) substrate 102, a buried oxide layer (BOX) 104 and an optical device layer 106. Exemplary materials for the optical device layer 106 include silicon, silicon nitride and silicon oxy-nitride. The actual optical circuit nano-taper 24 and 44 and waveguide 26 and 46 are firstly formed on the optical device layer 106. Cladding materials 108 are then deposited. The materials stacks may be stress engineered for the mode converters 14 and 34. Next, a stress-compensating material 110 may be deposited on the entire wafer, followed by selective etching to remove the stress-compensating material 110 from regions without need of stress compensation. The mode converters 14 and 34 may be subsequently formed by anisotropic etching of the cladding materials 108 and the BOX materials 104 to the Si substrate 102, followed by timed isotropic etching of the substrate 102 to release the mode converters 14 and 34. Finally, the wafer 100 may be back-grinded to reach a desired height.

Referring again to FIG. 1, in an embodiment where the first optical device 12 is to be formed with the planar first mode converter 14 that lies flat on a chip surface, this can be achieved by proper design of the first supporting beams 30 in terms of density, position, strength and coverage to the first input/output waveguide 18. Alternatively, the flat shape of the first mode converter 14 may be realized through stress engineering of cladding material, for example, by using identical materials for both bottom and top claddings.

In an embodiment where the second optical device 32 is to be formed with the second mode converter 34 having an upward-bending S-shape, this may also be achieved by stress-engineering of the cladding layer, for example, by utilization of materials with different stress values in the top cladding. Alternatively, a stress compensating material may be selectively placed on a region of the second input/output waveguide 38 and the first stress-compensated waveguide 52. For example, a low-stress oxide having a stress magnitude of less than 100 megapascal (MPa) may be used as cladding material for the first stress-compensated waveguide 52 and a high stress oxide having a stress magnitude of greater than 100 megapascal (MPa) such as high-density plasma (HDP) oxide may be used as the stress-compensating material.

In another approach, material stack variation may be designed for different locations of the second mode converter 34 through deposition and selective etching.

Advantageously, the first and second mode-size converters 14 and 34 may be conveniently fabricated in most semiconductor processes.

As stress-compensation is a well-established domain, a more detailed description of processes for fabricating the first and second optical devices 12 and 32 is not required for a complete understanding of the present invention.

Referring again to FIG. 1A, to attach the first and second optical devices 12 and 32 onto the substrate 10, a location fixing adhesive may first be dispensed on a region of the substrate 10 intended for chip placement. In such an embodiment, at least one of the first and second optical devices 12 and 32 may be attached to the substrate 10 using an ultra-violet (UV) gel. The UV gel locks down the chip position after ultra-violet (UV) curing.

At least one of the first and second optical devices 12 and 32 may be positioned on the substrate 10 with a pick-andplace apparatus. More particularly, a pick-and-place tool may be used to position the first and second optical devices 12 and 32 side-by-side on the substrate 10 with the first and second mode converters 14 and 34 facing one another. Alignment marks may be fabricated in the first and second integrated photonics chips 16 and 36 to assist the pick-and-place tool.

Following attachment of the first and second optical devices 12 and 32 to the substrate 10, an index-matching material 56 is disposed in a space between the first and second optical devices 12 and 32. This may be by injecting an index-matching adhesive 56 into the space between the first and second integrated photonics chips 16 and 36, the index-matching adhesive 56 flowing around the two suspended mode converters 14 and 34 and filling the gap between the first and second integrated photonics chips 16 and 36 and the first and second mode-converter regions 14 and 34.

The index-matching material 56 may be a gel or an epoxy. To expand the mode size, the index-matching material 56 may be chosen to have a small refractive index contrast (difference) from the waveguide itself. This allows optical mode to be expanded in the Y-direction. A refractive index of the index-matching material 56 may be less than that of the first and second mode converters 14 and 34. A differential between the refractive index of the index-matching material 56 and that of the first and second mode converters 14 and 34 may be between about 0.01 and about 0.60. Advantageously, by matching the refractive index of the first and second mode converters 14 and 34, light reflection between the first and second mode converters 14 and 34 is reduced.

Figure 1B:
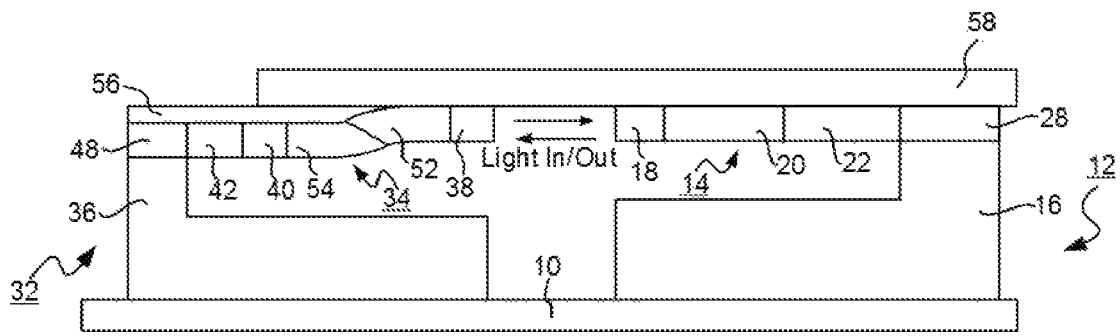

After depositing the index-matching material 56 in the space between the first and second optical devices 12 and 32, a force is then applied on the second optical device 32 as shown in FIG. 1A to cause the second optical mode converter 34 to align with the first optical mode converter 14 as shown in FIG. 1B.

In the embodiment shown, applying the force on the first optical device 12 involves positioning a planar member 58 over the second optical device 32, the planar member 58 overhanging over at least a portion of the second optical device 32, and pressing the planar member 58 to cause the planar member 58 to come into contact with the first optical device 12.

As can be seen from FIGS. 1A and 1B, the planar member 58 may be coarsely aligned before being pressed down on top of the first optical device 12 with most of the planar member 58 anchored and supported on the first optical device 12 with an overhanging portion covering a portion of the second optical device 32. As shown in FIG. 1B, the planar member 58 is pressed until the planar member 58 is in full contact with a top surface of the taller optical device, in this instance the first optical device 12. In this manner, both the first and second mode converters 14 and 34 become self-aligned in the height axis (Y-axis).

The planar member 58 may be made of glass or polymer. A differential between a refractive index of the planar member 58 and that of the first and second mode converters 14 and 34 may be between about 0.01 and about 0.30. Advantageously, this helps minimise optical mode leakage into the planar member 58.

The first integrated photonics chip 16 in the embodiment shown is of a greater height than the second integrated photonics chip 36. A height differential H between the first and second integrated photonics chips 16 and 36 may be between about 2 microns (μm) and about 50 μm. The height differential H may be realized by back-grinding chip substrates of one or both the first and second integrated photonics chips 16 and 36 with different target thickness and the height differential H may be larger than a thickness variation of a back-grinding tool. The upward-bending angle of the second mode converter 34 may be engineered to ensure that a top surface of the second mode converter 34 is higher than that of the first mode converter 14. Advantageously, these measures help ensure that the planar member 58 is horizontally level when being pressed to avoid damaging the first and second mode converters 14 and 34. More particularly, the shorter chip 36 with the upward bending mode converter 34 may intentionally be made shorter by back-grinding to a thinner thickness, but with the upward bending mode converter 34 protruding above the surface plane of the taller chip 16. When the planar member 58 presses down, the flexible upward bending mode converter 34 is pressed down to the same height as the opposite mode converter 14.

Further advantageously, the index-matching material 56 serves as a lubricant when the planar member 58 is being pressed and this helps avoid causing damage to the first and second mode converters 14 and 34.

Referring now to FIG. 1B, the index-matching material 56 is subsequently cured. This fixes or locks down the positions of the first and second integrated photonics chips 16 and 36, the first and second mode converters 14 and 34 and the planar member 58.

Advantageously, in the photonics packaging method described above, the two photonics chips 16 and 36 are self-aligned in the Y-direction (height) after packaging, without a need for active control and alignment. Through the use of the index-matching material 56 and the planar member 58, the first and second mode converters 14 and 34 may be self-aligned to the same height (Y-direction) when the chips 16 and 36 are assembled with a conventional pick-and-place tool.

To enable high alignment tolerance, waveguide dimensions, which affect optical mode dimensions, may be made as large as possible within reasonable fabrication limits. In the lateral X-direction, alignment tolerance may be improved through the design of the input/output waveguides 18 and 38, in particular, with an unusually large input/output waveguide width of greater than 15 microns (μm) and use of the index-matching material 56.

Although the mode converters have been described as being used in pairs with one on each of the chips to be packaged together, it will be appreciated by those of ordinary skill in the art that the present invention is not so limited and may be scaled up to multiple pairs to support multiple channels as required.

Figure 5:
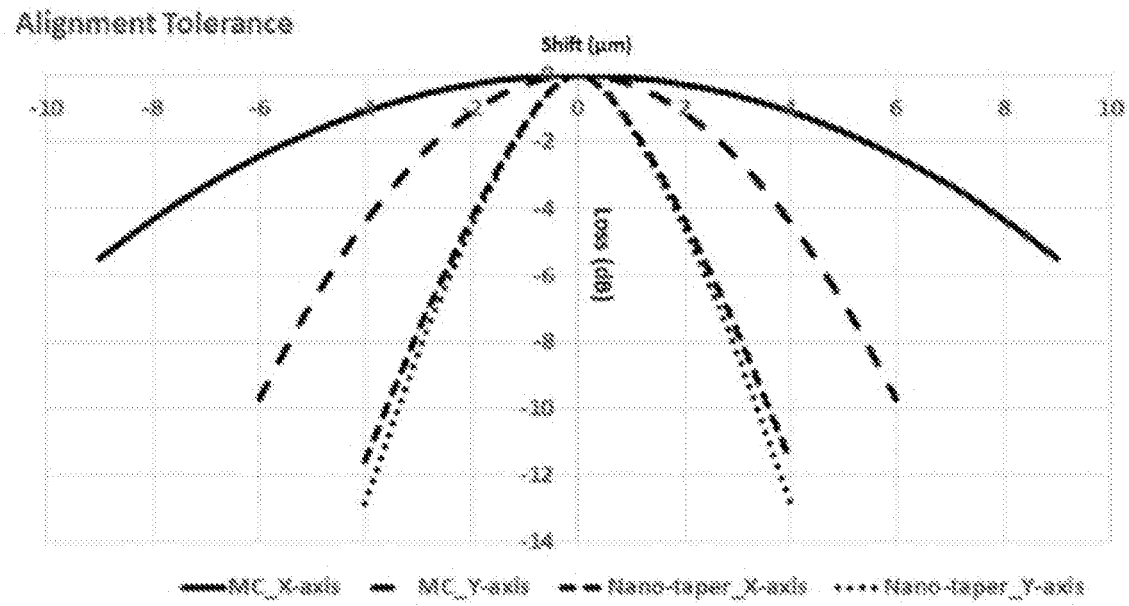
FIG. 5 is a graph showing improved alignment tolerance achieved with the photonics packaging method illustrated in FIGS. 1A and 1B.

Referring now to FIG. 5, a graph showing improved alignment tolerance achieved with the photonics packaging method of FIGS. 1A and 1B is presented. In particular, the graph of FIG. 5 shows simulated alignment tolerance for design mode converters (MCs). As can be seen from FIG. 5, a 3 decibel (dB) alignment tolerance of ±7 microns (μm) can be achieved in the X-direction. This is more than sufficient to realize passive optical alignment within the accuracy of a conventional pick-and-place tool. In comparison, a nano-taper, which is commonly used in silicon photonics products, only has a 3 dB alignment tolerance of ±1.5 μm under the same conditions. The graph demonstrates that a significant X-direction alignment tolerance can be achieved with the present invention.

As is evident from the foregoing discussion, the present invention provides a photonics packaging method with improved alignment tolerance. Advantageously, the photonics packaging method of the present invention enables passive optical alignment (self-alignment) between integrated photonic chips in the Y-direction through the use of a pair of edge couplers with similar optical mode dimensions. Edge couplers supporting passive optical alignment using conventional complementary metal-oxide-semiconductor (CMOS) pick-and-place tool are a key enabler for commercial viability as this facilitates photonics chip packaging with high yield and throughput. This helps modularize complex functionality into different photonics chips, facilitating separate yield enhancement and inventory optimization for diverse product lines. The mode converters disclosed facilitate low-loss coupling between the integrated photonic chips. Further advantageously, an improved X-direction alignment tolerance can also be achieved with the present invention.

While preferred embodiments of the invention have been illustrated and described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A photonics packaging method comprising:
providing a substrate;
attaching a first optical device to the substrate, wherein the first optical device comprises a first mode converter optically coupled to a first integrated photonics chip;
attaching a second optical device to the substrate, wherein the second optical device comprises a second mode converter optically coupled to a second integrated photonics chip, the second optical device being of a greater height than the first optical device;
disposing an index-matching material in a space between the first and second optical devices;
applying a force on the second optical device to cause the second optical mode converter to align with the first optical mode converter; and
curing the index-matching material.

2. The photonics packaging method of claim 1, wherein an input/output region of the second mode converter is in a first plane and a transmission region of the second mode converter is in a second plane, the first plane being further from the second integrated photonics chip than the second plane.

3. The photonics packaging method of claim 2, wherein the second mode converter comprises a curved section extending between the input/output region of the second mode converter in the first plane and the transmission region of the second mode converter in the second plane.

4. The photonics packaging method of claim 3, wherein the curved section of the second mode converter has an S-shaped cross-sectional profile.

5. The photonics packaging method of claim 3, wherein the curved section is a stress compensated region of the second mode converter.

6. The photonics packaging method of claim 1, wherein at least one of the first and second mode converters has an input/output waveguide with a width of greater than 15 µm.

7. The photonics packaging method of claim 1, wherein a refractive index of the index-matching material is less than that of the first and second mode converters.

8. The photonics packaging method of claim 7, wherein a differential between the refractive index of the index-matching material and that of the first and second mode converters is from about 0.01 to about 0.60.

9. The photonics packaging method of claim 1, wherein the first integrated photonics chip is of a greater height than the second integrated photonics chip.

10. The photonics packaging method of claim 9, wherein a height differential between the first and second integrated photonics chips is from about 2 µm to about 50 µm.

11. The photonics packaging method of claim 1, wherein the step of applying the force on the first optical device comprises:
positioning a planar member over the second optical device, the planar member overhanging over at least a portion of the second optical device; and
pressing the planar member to cause the planar member to come into contact with the first optical device.

12. The photonics packaging method of claim 11, wherein a differential between a refractive index of the planar member and that of the first and second mode converters is from about 0.01 to about 0.30.

13. The photonics packaging method of claim 1, wherein at least one of the first and second optical devices is attached to the substrate using an ultra-violet (UV) gel.

14. The photonics packaging method of claim 1, further comprising positioning at least one of the first and second optical devices on the substrate with a pick-and-place apparatus.

* * * * *